(12) United States Patent
Kontu

(10) Patent No.: US 9,849,404 B2
(45) Date of Patent: Dec. 26, 2017

(54) APPARATUS FOR VAPOURISING A MEDIUM AND SEPARATING DROPLETS AS WELL AS FOR CONDENSING THE MEDIUM

(71) Applicant: VAHTERUS OY, Kalanti (FI)

(72) Inventor: Mauri Kontu, Kalanti As (FI)

(73) Assignee: VAHTERUS OY, Kalanti (FI)

( * ) Notice: Subject to any disclaimer, the term of this patent is extended or adjusted under 35 U.S.C. 154(b) by 554 days.

(21) Appl. No.: 14/390,884

(22) PCT Filed: Apr. 4, 2013

(86) PCT No.: PCT/FI2013/000016
§ 371 (c)(1),
(2) Date: Oct. 6, 2014

(87) PCT Pub. No.: WO2013/150175
PCT Pub. Date: Oct. 10, 2013

(65) Prior Publication Data
US 2015/0114817 A1 Apr. 30, 2015

(30) Foreign Application Priority Data
Apr. 4, 2012 (FI) ..................................... 20125383

(51) Int. Cl.
*B01D 5/00* (2006.01)
*B01D 1/28* (2006.01)
(Continued)

(52) U.S. Cl.
CPC ............. *B01D 5/0015* (2013.01); *B01D 1/28* (2013.01); *B01D 1/305* (2013.01); *F25B 1/005* (2013.01);
(Continued)

(58) Field of Classification Search
CPC ........ B01D 1/28; B01D 1/305; B01D 5/0015; F25B 1/005; F25B 39/00; F25B 39/02;
(Continued)

(56) References Cited

U.S. PATENT DOCUMENTS

| 4,437,322 A | 3/1984 | Ertinger |
| 5,232,557 A * | 8/1993 | Kontu ..................... C01D 3/06 159/24.1 |

(Continued)

FOREIGN PATENT DOCUMENTS

| DE | 28 39 415 | 3/1980 |
| DE | 44 14 621 | 6/2005 |

(Continued)

OTHER PUBLICATIONS

International Search Report for PCT/FI2013/000016, dated Jul. 26, 2013.
(Continued)

*Primary Examiner* — Renee Robinson
(74) *Attorney, Agent, or Firm* — Nixon & Vanderhye P.C.

(57) ABSTRACT

An apparatus for vaporizing a medium and separating droplets as well as for condensing, in which apparatus an evaporator (A) and a condenser (B) are arranged inside a single outer casing in such a manner that they are separated from each other by a partition wall.

14 Claims, 3 Drawing Sheets

Figure 1:
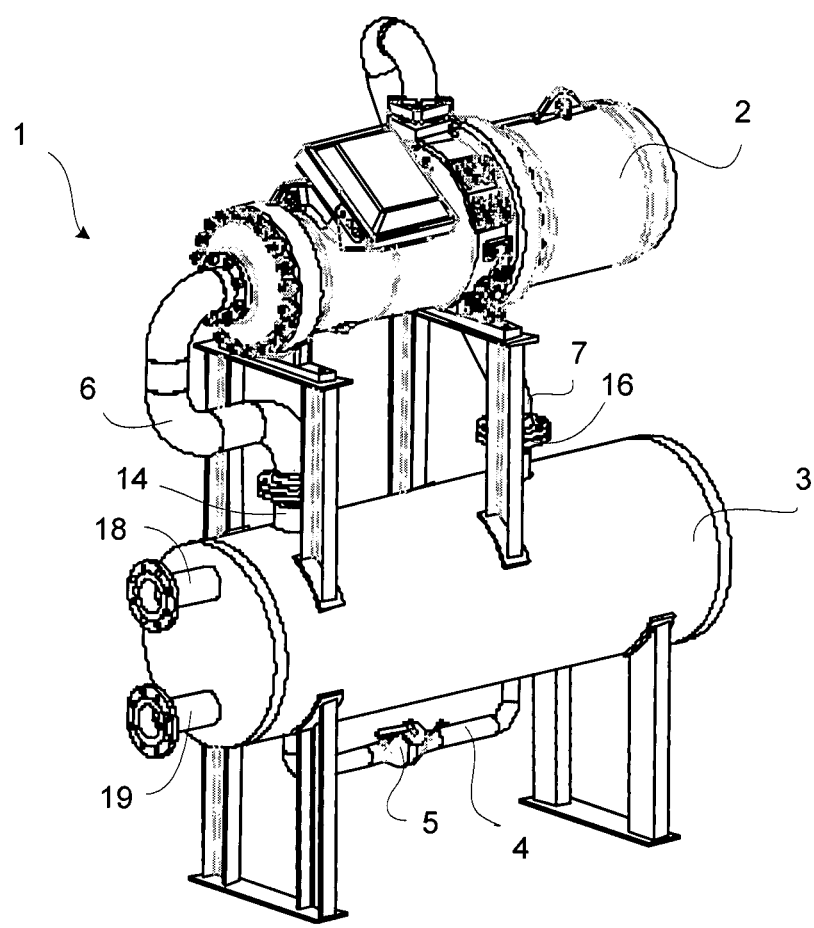

(51) Int. Cl.
*B01D 1/30* (2006.01)
*F25B 1/00* (2006.01)
*F28D 9/00* (2006.01)
*F25B 39/00* (2006.01)
*F28F 9/00* (2006.01)
*F28D 21/00* (2006.01)

(52) U.S. Cl.
CPC ............ *F25B 39/00* (2013.01); *F28D 9/0006* (2013.01); *F28D 9/0012* (2013.01); *F28D 9/0043* (2013.01); *F28D 9/0093* (2013.01); *F28F 9/005* (2013.01); *F25B 2339/02* (2013.01); *F25B 2339/0241* (2013.01); *F25B 2339/04* (2013.01); *F25B 2339/041* (2013.01); *F25B 2400/23* (2013.01); *F28D 2021/007* (2013.01); *F28D 2021/0066* (2013.01); *F28D 2021/0071* (2013.01)

(58) Field of Classification Search
CPC .. F25B 39/022; F25B 39/04; F25B 2239/022; F25B 2239/041; F25B 2239/043; F28D 9/0006; F28D 9/0043; F28D 9/0093; F28D 2021/0066
See application file for complete search history.

(56) References Cited

U.S. PATENT DOCUMENTS

| 6,158,238 | A | 12/2000 | Lampinen et al. | |
| 6,238,524 | B1* | 5/2001 | Zebuhr | B01D 1/223 159/18 |
| 6,442,951 | B1* | 9/2002 | Maeda | F24F 3/1423 62/271 |
| 7,472,563 | B2* | 1/2009 | Knoll | F25B 39/022 165/159 |
| 2008/0190591 | A1 | 8/2008 | Ayub | |

FOREIGN PATENT DOCUMENTS

| EP | 0 901 602 | 3/1999 |
| EP | 2 174 810 | 4/2010 |

OTHER PUBLICATIONS

Finland Search Report for FI Application No. 20125383, dated Feb. 13, 2013.

* cited by examiner

APPARATUS FOR VAPOURISING A MEDIUM AND SEPARATING DROPLETS AS WELL AS FOR CONDENSING THE MEDIUM

This application is the U.S. national phase of International Application No. PCT/FI2013/000016, filed 4 Apr. 2013, which designated the U.S. and claims priority to Finland Patent Application No. 20125383, filed 4 Apr. 2012, the entire contents of each of which are hereby incorporated by reference.

FIELD OF THE INVENTION

The invention relates to an apparatus for vapourising a medium and separating droplets as well as for condensing, according to the preamble of the appended independent claims.

BACKGROUND OF THE INVENTION

Some important applications of plate heat exchangers are i.a. a so-called flooded evaporator, which is used in large refrigerating machineries, and a droplet separator related thereto as well as condensers. A similar application is also heat pumps that use an evaporator and a condenser. Typically the evaporator and the condenser are located separately, inside separate outer casings. Building the evaporator and the condenser separate from each other increases i.a. manufacturing costs and the weight and size of the arrangement, whereby the space required by the arrangement is large. Typically also the droplet separator and the evaporator are arranged inside separate casing parts and the containers are preferably arranged one on top of the other. Also this increases the requirement of space for the arrangement and requires additional pipings in the apparatus.

OBJECT AND DESCRIPTION OF THE INVENTION

An object of the present invention is to reduce or even eliminate the above-mentioned problems appearing in prior art.

An object of the present invention is to provide a solution comprising an evaporator and a droplet separator as well as a condenser, that is small in size and that can be easily manufactured using standard sized parts of heat exchanger.

It is an important object of the present invention to provide a solution, where the amount of refrigerant or other medium to be vapourised is as small as possible.

To achieve this object, the apparatus and system according to the invention is primarily characterised in what is presented in the characterising parts of the independent claims.

The other, dependent claims present some preferred embodiments of the invention.

A typical apparatus according to the invention for vapourising a medium and separating droplets as well as for condensing comprises at least an outer casing, that comprises a substantially horizontal cylindrical shell and substantially vertical ends,
a partition wall that divides the inside of the cylindrical shell in the horizontal direction to a first part and a second part,
a plate pack functioning as an evaporator, which is arranged inside the first part, in its lower part;
an inlet connection and an outlet connection for a heat exchange medium for leading the medium into and out from the plate pack functioning as an evaporator,
a gravitational droplet separator that is arranged inside the first part above the plate pack functioning as an evaporator,
an inlet connection for the medium to be vapourised for leading the medium to be vapourised into the first part and an outlet connection for the vapourised medium for leading the vapourised medium out from the first part, at its upper part,
a plate pack functioning as a condenser, which is arranged inside the second part,
an inlet connection and an outlet connection for a heat exchange medium for leading the medium into and out from the plate pack functioning as an evaporator, and
an inlet connection for leading the vapourised medium into the second part and an outlet connection for leading the condensed medium out from the second part.

A typical system according to the invention comprises at least an evaporator,
a compressor,
a condenser,
means for leading the medium circulating in the system from the evaporator to the compressor, from the compressor to the condenser and from the condenser to the evaporator, and
an expansion valve through which the medium circulating in the system is lead from the condenser to the evaporator, and in which system the condenser and the evaporator are arranged inside a same outer casing as an apparatus according to the invention.

In an apparatus according to the invention, an evaporator and a condenser are formed inside one outer casing in such a manner that the evaporator side and the condenser side are separated from each other by a partition wall. Typically, small sized welded Plate and Shell™-type heat exchangers are used in an apparatus according to the invention, which enable keeping the apparatus small in size and thereby also the surface size of the partition wall has been kept small in the apparatus according to the invention, thus the partition wall does not affect the functioning of the apparatus and the different functioning temperatures of the evaporator side and the condenser side.

Since the components used in the apparatus according to the invention can be standard parts or otherwise commonly used, the manufacturing costs of the apparatus according to the invention can be kept low. For example, the plate packs of the evaporator and the condenser can be manufactured using a normal welded structure composed of circular heat exchange plates. For example the applicant's own welded plate pack consisting of circular heat exchange plates which is used in Plate&Shell™ heat exchangers, can be used as the plate pack. These plate packs are formed by arranging circular heat exchange plates on top of each other, which heat exchange plates are tightly welded to each other at openings therein and/or at the perimeters of the plates. Thus plate pairs are formed in the plate pack, in which the inner parts of the plate pairs are arranged in connection with the inlet connection and the outlet connection that are in connection with the plate pack.

The cylindrical shell in the apparatus according to the invention is usually horizontal, the term longitudinal direction of the outer casing or cylindrical shell used in this text typically means the horizontal direction. For example if the cylindrical shell of the outer casing is a straight circular cylinder, then its longitudinal direction is the same as the direction of the central axis of the cylinder in question. The plate pack functioning as an evaporator and the plate pack functioning as a condenser are also mainly circular cylinders in shape, in which longitudinal direction is the longitudinal direction of the cylindrical shell. In other words, a plate pack formed by heat exchange plates arranged one on top of each other is arranged inside the cylindrical shell so that the longitudinal direction of the plate pack is the same as the longitudinal direction of the cylindrical shell.

Typically in an apparatus according to the invention, the outer casing of the apparatus functions as a pressure vessel.

The apparatus according to the invention comprises, inside a same outer casing, two separate functional parts comprising a plate pack: an evaporator and a condenser, which plate packs are arranged on different sides of a partition wall inside the cylindrical shell. These separate parts, the evaporator and the condenser, are connected to each other only via pipings arranged on the connections of the parts. The partition wall is arranged inside the horizontal cylindrical shell mainly vertically. In one embodiment of the invention, the thickness of the partition wall is typically 5-20 mm.

In one embodiment of the invention, the partition wall comprises a layer of insulating material, such as mineral wool or other similar material. Typically the layer of insulating material is arranged in the partition wall between two metal plates, whereby the partition wall of an apparatus according to the invention comprises a sandwich structure that has a first and a second metal plate and a layer of insulating material in between them.

Typically in an apparatus according to the invention the partition wall is arranged inside a cylindrical shell in such a manner that the part functioning as an evaporator is about 50-70% of the cylindrical shell in the longitudinal direction of the cylindrical shell.

The plate pack of the evaporator side is smaller in outer diameter than the plate pack of the condenser side, and thus the cylindrical shell functioning as the outer casing of the apparatus according to the invention is dimensioned according to the plate pack of the condenser side. Typically the outer diameter of the plate pack functioning as a condenser is 100-200 mm larger than the outer diameter of the plate pack functioning as an evaporator. The diameters of the plate packs are typically 200-900 mm. Between the outer surface of the plate pack of the condenser side and the inner surface of the cylindrical shell, there are only flow channels that enable the flow of the medium on the pack side through the plate pack on the whole length of the plate pack. Typically the distance between the outer surface of the plate pack and the inner surface of the cylindrical shell is about 5-20 mm. On the evaporator side, the outer diameter of the plate pack is typically about 30-70% and most typically 40-60% of the inner diameter of the cylindrical shell, and the plate pack is arranged on the lower part of the cylindrical shell in such a manner that above it, on the upper part of the cylindrical shell, a gravitational droplet separator can be arranged. Typically the plate pack of the evaporator side is located in an acentric manner in relation to the cylindrical shell at the lower part of the cylindrical shell, that is, the midpoint of the cross-section of the plate pack substantially deviates from the midpoint of the cross-section of the shell.

In an apparatus according to the invention the flow connections of the pack side of the heat exchanger are usually placed in the ends of the heat exchanger and the flow connections of the shell side in the shell. In an apparatus according to the invention, inlet connections and outlet connections are arranged through the end plates of the outer casing for leading the heat exchange mediums to the plate packs in the apparatus. One end plate comprises connections for leading the heat exchange medium into and out from the plate pack functioning as an evaporator and the other end plate comprises connections for leading the heat exchange medium into and out from the plate pack functioning a condenser. The inlet connections and outlet connections of the heat exchange medium have been arranged in connection to inner parts of the plate pack, i.e. to inner parts of the plate pair of the plate pack, whereby a primary circuit of the plate heat exchanger is formed between the inlet connection and outlet connection of the heat exchange medium, whereby there are plate spaces of the primary circuit inside the plate pairs. In an apparatus according to the invention, inlet connections and outlet connections for the medium to be evaporated/evaporated medium are arranged through the cylindrical shell of the outer casing, which connections are arranged in connection with the inside of the shell, that is the outside of the plate pack, whereby a secondary circuit of the plate heat exchanger is formed between the inlet connection and outlet connection of the medium to be evaporated/evaporated medium, whereby plate spaces of the secondary circuit are between adjacent plate pairs of the plate pack. In other words, a primary circuit of the heat exchanger is formed between the openings in the heat exchange plates and a secondary circuit between connections of the shell surrounding the plate pack, so that a primary side flow medium flows in every other plate space of the plate pack and a secondary side flow medium in every other plate space of the plate pack.

In one embodiment according to the invention the inlet connection in the first part of the apparatus that is the evaporator side, for the medium to be vapourised is arranged on the bottom of the cylindrical shell. The outlet connection of the vapourised medium is arranged on the upper part of the cylindrical shell, above the droplet separator. In one embodiment of the invention the inlet connection in the second part of the apparatus that is the condenser side, for leading the vapourised medium into the condenser side is arranged on the upper part of the cylindrical shell and the outlet connection of the condensed medium is typically arranged on the lower part of the cylindrical shell.

In one preferred embodiment of the invention, the apparatus comprises a connecting tube for leading the medium to be vapourised from the second part functioning as a condenser to the first part functioning as an evaporator. Typically this connecting tube between the evaporator and the condenser comprises an expansion valve. The process taking place in the apparatus is controlled with the expansion valve.

In one embodiment of the apparatus according to the invention one or more filler unit(s) have been arranged in the first part functioning as an evaporator, between the inner surface of the cylindrical shell and the plate pack, which filler unit is arranged to decrease the liquid volume of the medium to be vapourised inside the outer casing. In other words, the function of the filler units is to make the amount of the refrigerant or other medium to be vapourised in the apparatus as small as possible. Longitudinal filler units have typically been arranged on both sides of the plate pack, which plate pack is in the longitudinal direction of the cylindrical shell. The filler units can be shaped according to need to decrease the liquid volume as much as possible.

The filler units to be arranged in the evaporator part can be manufactured in several different manners. In one embodiment of the invention the filler unit is manufactured from one uniform piece. In another embodiment of the invention the filler unit is manufactured from several plates attached together, which plates are substantially in the direction of the end of the outer casing. The attaching of the plates to each other can be done for example with bolts or by gluing. The plates can be made of for example plastic or metal.

A typical filler unit is manufactured from a material, which can withstand the conditions prevailing in the apparatus. For example in refrigerating devices the filler unit must typically withstand ammonia without corroding. In one embodiment of the invention the filler unit is manufactured from plastic, such a HDPE, LDPE, expanded polystyrene or a corresponding material. In another embodiment of the invention the filler unit is manufactured from metal, for example steel, such as carbon steel or stainless steel.

In one embodiment of the invention a flow channel for the medium to be vapourised and for the generated vapour has been arranged between one or more filler units and the plate pack. In one embodiment of the invention a flow channel for the medium to be vapourised and for the generated vapour has been arranged between the filler unit and the cylindrical shell. The flows and the heat exchange are made more efficient with suitable flow channels. In said flow channels the distance between the filler unit and the plate pack or the filler unit and the inner surface of the cylindrical shell can be for example 5-100 mm or 5-50 mm or 10-30 mm. In the horizontal direction said flow channels can have the length of at least almost the entire plate pack or cylindrical shell. Whether liquid or vapour travels in the flow channels and in which ratio and in which direction, depends on the situation at any time.

In one embodiment of the invention the evaporator part of the apparatus further comprises a demister droplet separator, which is arranged inside the outer casing, in its upper part, beneath the outlet connection for vapourised medium. Thereby in the apparatus according to the invention the droplet separation based on gravity and filtration, i.e. demister, can be combined. The demister can be filled with for example steel wool or a corresponding material generating as low flow resistance as possible. By placing the plate pack functioning as the evaporator, the gravitational droplet separator and the demister inside the same outer casing, a particularly small size and simple structure is obtained for the apparatus.

In one embodiment of the invention the demister is installed approximately horizontally in the longitudinal direction of the cylindrical shell, but diagonally downwards toward the edges of the apparatus in the transverse direction of the cylindrical shell. Thus the part of the outer casing beneath the demister, i.e. the gravitational droplet separator, can be arranged to be as large as possible. The demister simultaneously steers droplets within it in a controlled manner downwards toward the edges of the apparatus.

In one embodiment of the invention the demister consists of one or several vapour-permeable demister parts and a vapour-impermeable part. The vapour-impermeable part is typically installed directly beneath the outlet connection for vapourised medium.

In one embodiment of the invention, in the upper part of the first part functioning as an evaporator, a superheater has additionally been arranged above the plate pack functioning as an evaporator. In another embodiment of the invention, inside the second part functioning as a condenser has additionally been arranged a plate pack functioning as a supercooler of the condensed medium, which plate pack has been arranged, in the longitudinal direction of the cylindrical shell, next to the plate pack functioning as a condenser, that is, the condenser plate pack and the supercooler of the condenser are connected to each other in series inside one single uniform part, via pipings. In one embodiment of the invention, inside one same outer casing has thus been arranged an evaporator, a droplet separator, a superheater, a condenser and a supercooler of the condenser.

The system according to the invention comprises an apparatus according to the invention, in which apparatus inside one same outer casing at least an evaporator and a condenser have been arranged, as well as a compressor and means for leading the medium circulating in the system from the evaporator to the compressor, from the compressor to the condenser and from the condenser to the evaporator and an expansion valve, through which the medium circulating in the apparatus is lead from the condenser to the evaporator. Therefore an apparatus according to the invention can be used as a flooded evaporator of a refrigerating machinery and thereto related droplet separator as well as a condenser. The apparatus according to the invention can be used also in heat pump applications.

SHORT DESCRIPTION OF THE DRAWINGS

Figure 2:
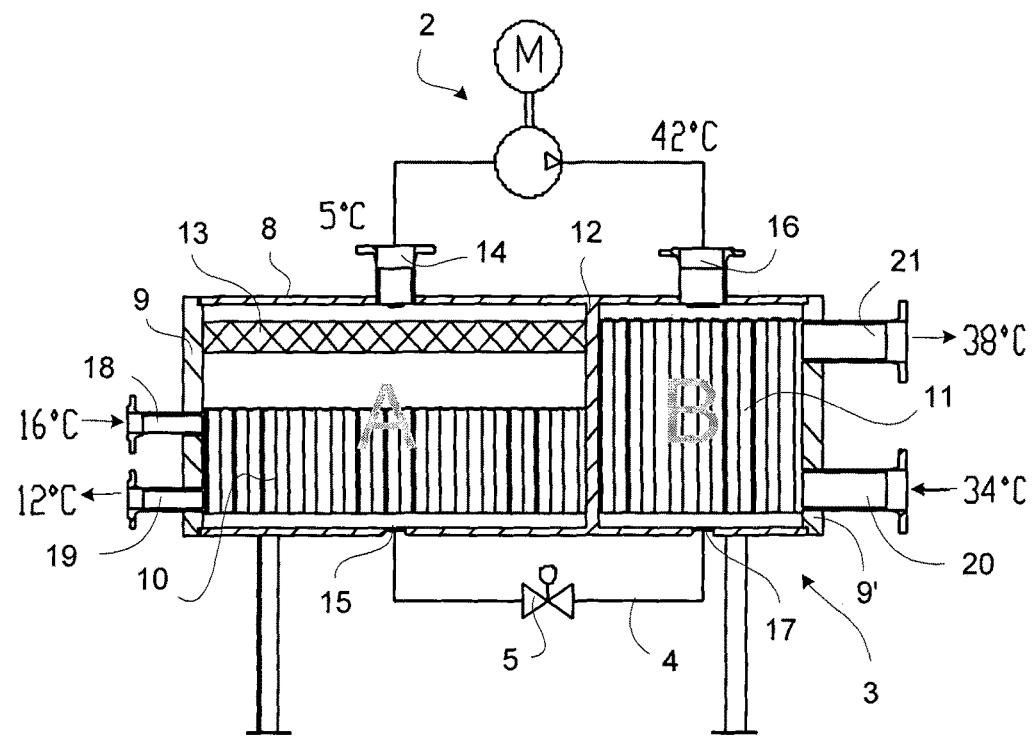
Figure 3:
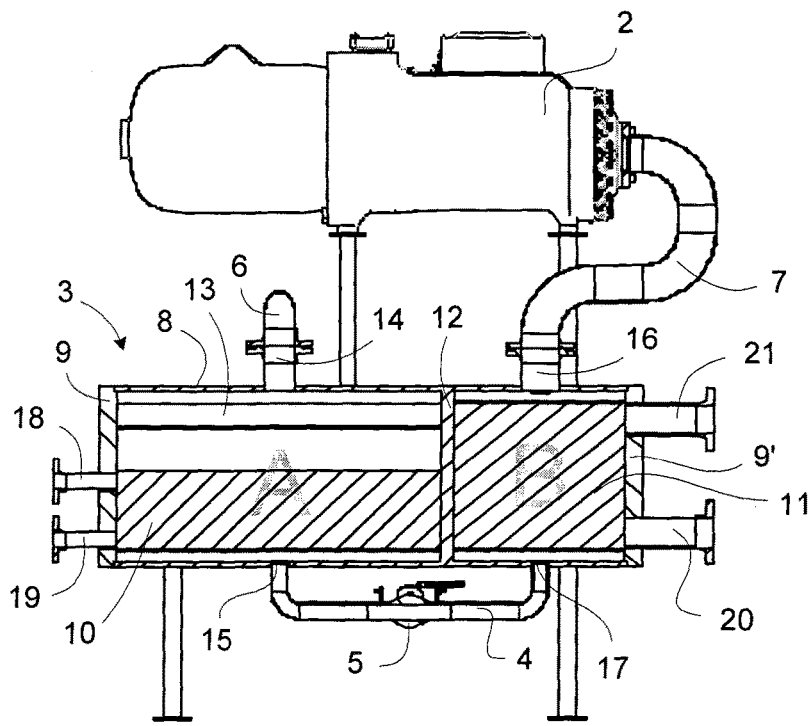
Figure 4:
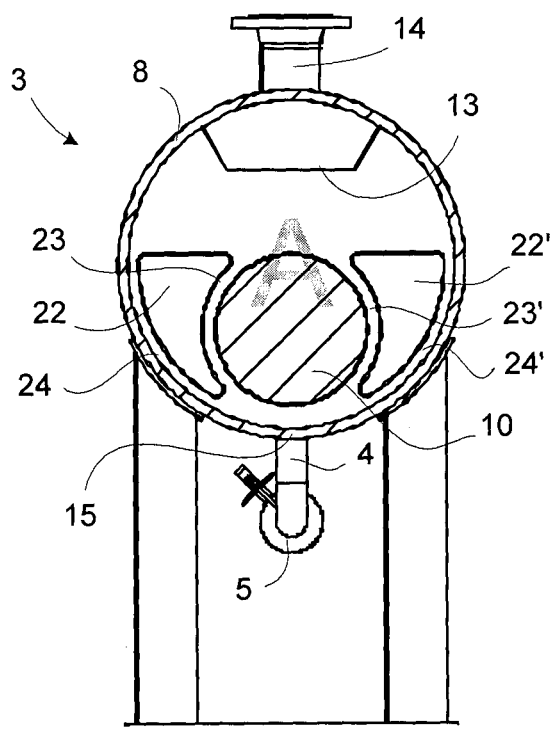
Figure 5:
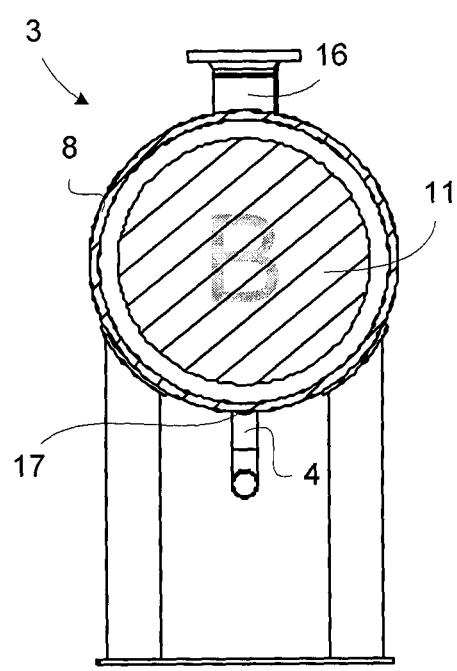

In the following, the invention will be described in more detail with reference to the appended drawings, in which FIG. 1 shows a system according to the invention, in which a compressor is arranged above an evaporator-condenser, FIG. 2 shows the process flow in a system according to the invention, FIG. 3 shows a cross-section of an apparatus according to the invention, FIG. 4 shows a cross-section of an evaporator part in an apparatus according to the invention, and FIG. 5 shows a cross-section of a condenser part in an apparatus according to the invention.

DETAILED DESCRIPTION OF THE INVENTION

Same reference signs have been used in the Figures for parts corresponding to each other.

In FIGS. 1-5 some apparatuses according to the invention are shown, in which inside one outer casing functioning as a frame, that is for example into a flat-ended cylinder 8 as shown in FIGS. 2 and 3, a Plate&Shell™-type plate pack 10 functioning as an evaporator, a gravitational droplet separator 13 and a second Plate&Shell™-type plate pack 11 functioning as a condenser have been arranged.

FIG. 1 shows a system 1 according to the invention, which comprises a compressor 2 and an apparatus 3 according to the invention, in which apparatus both an evaporator and a condenser have been arranged inside one same outer casing. In the system of the Figure, a compressor 2 is arranged above an evaporator-condenser 3 according to the invention, whereby the evaporator-condenser 3 functions as a frame into which the compressor can be secured. The tube 4 underneath the evaporator-condenser 3 is arranged to extend from the condenser to the evaporator and is equipped with an expansion valve 5, by which the process of the system is controlled. FIG. 1 also shows a connecting tube 6 from the evaporator according to the invention to the compressor 2 and a connecting tube 7 from the compressor 2 to the condenser according to the invention.

FIG. 2 shows schematically the process flow in a system 1 according to the invention and in FIG. 3 is shown an evaporator-condenser 3 according to an embodiment of the invention as a cross-section. Temperature values have been added to FIG. 2, which are meant only to illustrate the process flow in the system, the given temperatures thus not limiting the invention. An apparatus 3 according to the invention that comprises an evaporator (part A) and a condenser (part B) inside one same outer casing, is shown in the Figure as a cross-section. In a system according to the invention, the medium to be vapourised, for example a refrigerant, is evaporated in an evaporator (part A), the heat exchange medium flowing through the plate pack 10 functioning as an evaporator heats the medium to be vapourised, while at the same time cools down itself. The evaporated and heated medium is led from the evaporator A to the compressor 2. After the compressor 2 the compressed medium is led to the condenser (part B), which is arranged to cool the medium and to condensate it to liquid. The released heat heats up the heat exchange medium such as water or air flowing through the plate pack 11 functioning as a condenser. Thereafter the medium circulating in the system flows through the expansion valve 5 back to the evaporator A and a new round of the medium circulating in the system starts from the beginning.

As in shown in FIGS. 2 and 3, the outer casing of the apparatus 3 is formed of a substantially horizontal cylindrical shell 8 and substantially vertical ends 9, 9'. The evaporator part A and the condenser part B of the apparatus 3 are separated from each other by a partition wall 12. The evaporator part A inside the cylindrical shell 8 comprises a plate pack 10, a so-called evaporator plate pack, and a droplet separator 13. The condenser part B comprises a plate pack 11, a so-called condenser plate pack.

The medium to be vapourised, for example a refrigerant, is lead from the condenser part B of the apparatus 3 to the evaporator part A via a connecting tube 4, into which connecting tube 4 an expansion valve 5 has been arranged. The medium to be vapourised is led to the evaporator A typically through an inlet connection 15 arranged on the bottom part of the cylindrical shell 8. The evaporated medium exits the evaporator part A through an outlet connection 14 at the upper part of the outer casing. A heating medium is led to the evaporator part A through the end 9 of the outer casing into the plate pack 10 with the inlet connection 18 and removed from the plate pack 10 through the end 9 of the outer casing with the outlet connection 19. The inlet connection 18 and the outlet connection 19 extend through the plate pack 10 to evenly distribute the flow of the heating medium to the whole plate pack 10.

The condenser part B of the apparatus 3 comprises an inlet connection 16 for leading the medium from the compressor 2 to the condenser B, the inlet 16 connection is typically arranged on the upper part of the cylindrical shell 8. The condenser part B comprises also an outlet connection 17 for the medium to be vapourised, typically on the lower part of the cylindrical shell 8. An inlet connection 20 and an outlet connection 21 have been arranged in connection with the inner parts of the plate pack 11 of the condenser part B.

In the evaporator part A the vapour formed from the liquid surface (not shown in the Figure) of the medium to be vapourised rises up through the gravitational droplet separator 13 in the upper part of the cylindrical shell of the apparatus. The droplet separator may comprise a demister, such as for example a layer of steel wool that separates the finely divided droplets from the vapour. After passing through the demister, the vapour can exist through the outlet connection 14 at the upper part of the outer casing. From thereon, the evaporated refrigerant is lead further, for example to a compressor 2 of a refrigerating apparatus.

FIG. 4 shows an evaporator part A in an apparatus 3 according to the invention as a cross-section. The evaporator part A of the apparatus 3 is arranged inside a cylindrical shell 8. The evaporator part comprises a plate pack 10 that is typically arranged in the lower part of the cylindrical shell and a droplet separator 13 that is arranged above the plate pack at the upper part of the cylindrical shell. The outer surfaces of the plate pack 10 function as heat exchange surfaces of the evaporator. FIG. 4 shows also filler units 22 and 22' arranged between the outer casing of the cylindrical shell 8 and the plate pack 10 in one embodiment of the invention. The liquid volume of the evaporator part has been reduced by arranging longitudinal filler units 22 and 22' to both sides between the cylindrical shell 8 and the plate pack 10. The filler units 22, 22' are designed such that they reduce the liquid volume of the evaporator part as much as possible. The filler units are attached in place for example with plates or collars which have their shape. Typically flow channels 24, 24' are arranged between the filler unit and the cylindrical shell 8, and typically flow channels 23, 23' are arranged between the filler unit and the plate pack 10. Along the flow channels the liquid to be vapourised can sink and the generated vapour can rise.

The casing of the filler units 22, 22' is substantially tight to liquids. It can be manufactured for example from metal plate or plastic. A filler material is arranged inside the filler units, for example sand, concrete or plastic such as expanded polystyrene or another material suitable for the purpose.

In FIG. 4, the inlet connection 15 of the medium to be vapourised is arranged at the bottom of the cylindrical shell 8 and the outlet connection 14 of the vapourised medium is arranged at the upper part of the cylindrical shell 8 above the droplet separator 13.

The level of the medium to be vapourised, such as the refrigerant or other liquid to be vapourised, is advantageously adjusted to the level of the diameter of the cylindrical shell (not shown in the Figure), whereby the surface area of the medium to be vapourised is as large as possible and the production of vapour per surface area is as small as possible. The ascension speed of the vapour is thus also as small as possible, whereby the generated droplets travelling with the vapour more easily fall back down. Thus the gravitational droplet separation is made more efficient.

FIG. 5 shows a condenser part B in an apparatus 3 according to the invention as a cross-section. A plate pack 11 is arranged inside a cylindrical shell 8. The vapourised medium is led to the condenser B through an inlet connection 16 and the cooled medium is let out from the condenser through an outlet connection 17. The inlet connection 16 and the outlet connection 17 are arranged into the cylindrical shell, whereby the circuit of the medium to be condensed is formed on the shell side of the plate pack 11. A connecting tube 4 has been arranged to the inlet connection 17, whereby the medium to be vapourised is led to the evaporator.

The invention is not intended to be limited to the above-presented exemplary embodiments, but the intention is to apply the invention widely within the inventive idea defined by the claims defined below.

The invention claimed is:
1. An apparatus for vapourising a vapourisable medium, separating droplets therefrom and condensing the vapourisable medium when vapourized, wherein the apparatus comprises:

an outer casing that comprises substantially vertical ends and a substantially horizontal cylindrical shell having an inner surface which defines a substantially horizontal interior space between the vertical ends, a substantially vertical partition wall that cross-sectionally divides the interior space of the cylindrical shell into separate horizontally oriented fluid-isolated functional spaces comprised of a first horizontally oriented subspace (A) and a second horizontally oriented subspace (B), an evaporator plate pack functioning as an evaporator which is arranged inside a lower region of the first horizontally oriented subspace (A) of the cylindrical shell, evaporator inlet and outlet connections for leading a heat exchange medium into and out from the evaporator plate pack, respectively, a gravitational droplet separator that is arranged inside the first horizontally oriented subspace (A) of the cylindrical shell I above the evaporator plate pack, an inlet connection for the vapourisable medium for leading the vapourisable medium into the first horizontally oriented subspace (A) of the cylindrical shell to thereby form a vapourised medium, and an outlet connection for leading the vapourised medium out from an upper region of the first horizontally oriented subspace (A) of the cylindrical shell, a condenser plate pack functioning as a condenser which is arranged inside the second horizontally oriented subspace (B) of the cylindrical shell, condenser inlet and outlet connections for leading the heat exchange medium into and out from the condenser plate pack, respectively, a vapourised medium inlet connection for leading the vapourised medium into the second horizontally oriented subspace (B) of the cylindrical shell, and a condensed medium outlet connection for leading the condensed medium out from the second horizontally oriented subspace (B) of the cylindrical shell.

2. The apparatus according to claim 1, wherein each of the evaporator plate pack and the condenser plate pack includes an arrangement of circular heat exchange plates on top of each other, wherein heat exchange plates are attached to each other as plate pairs at openings in the plates and/or at perimeters of the plates, and wherein inner parts of the plate pairs are arranged in connection with the evaporator inlet and outlet connections and the condenser inlet and outlet connections of the evaporator and condenser plate packs, respectively.

3. The apparatus according to claim 1, wherein the evaporator plate pack has an outer diameter that is 30-70% of an inner diameter of the cylindrical shell.

4. The apparatus according to claim 1, wherein the condenser plate pack has an outer diameter that is 100-200 mm larger than an outer diameter of the evaporator plate pack.

5. The apparatus according to claim 1, wherein the partition wall has a thickness of 5-20 mm.

6. The apparatus according to claim 1, wherein the partition wall comprises first and second metal plates and a layer of insulating material that is arranged between the first and second metal plates.

7. The apparatus according to claim 1, wherein the first horizontally oriented subspace (A) is about 50-70% of the substantially horizontal interior space of the cylindrical shell.

8. The apparatus according to claim 1, wherein the evaporator and condenser inlet and outlet connections a are arranged through a respective one of the vertical ends of the outer casing adjacent the evaporate and condenser plate packs.

9. The apparatus according to claim 1, which further comprises a connecting tube for leading the vapourisable medium from the second horizontal subspace (B) which includes the condenser plate pack to the first horizontal subspace (A) which includes the evaporator plate pack, and an expansion valve provided in the connecting tube.

10. The apparatus according to claim 1, which further comprises at least one filler unit arranged in the first horizontal subspace (A) between the inner surface of the cylindrical shell and the evaporator plate pack, the at least one filler unit being arranged to decrease liquid volume of the vapourisable medium inside the outer casing.

11. The apparatus according to claim 1, wherein the first horizontal subspace (A) further comprises a demister droplet separator which is arranged inside the outer casing at the upper region of the first horizontal subspace (A) beneath the outlet connection for the vaporised medium.

12. The apparatus according to claim 1, which further comprises a superheater arranged in the first horizontal subspace (A) above the evaporator plate pack.

13. The apparatus according to claim 1, which further comprises a condensation supercooler in the second horizontal subspace (B) adjacent to the condenser plate pack.

14. A system comprising:
an evaporator,
a compressor,
a condenser,
conduits for leading a medium circulating in the system from the evaporator to the compressor, from the compressor to the condenser and from the condenser to the evaporator, and
an expansion valve, through which the medium circulating in the system is lead from the condenser to the evaporator, wherein
the evaporator and the condenser are arranged in the system inside a single outer casing as an apparatus according to claim 1.

* * * * *